United States Patent
Rehmanji et al.

(10) Patent No.: US 7,153,534 B2
(45) Date of Patent: Dec. 26, 2006

(54) PREMIX COMPOSITION FOR CLARIFYING BEER

(75) Inventors: Mustafa Rehmanji, Bloomingdale, NJ (US); Andrew Mola, Wayne, NJ (US)

(73) Assignee: ISP Investments Inc., Wilmington, DE (US)

( * ) Notice: Subject to any disclaimer, the term of this patent is extended or adjusted under 35 U.S.C. 154(b) by 618 days.

(21) Appl. No.: 10/648,660

(22) Filed: Aug. 26, 2003

(65) Prior Publication Data

US 2004/0043119 A1 Mar. 4, 2004

Related U.S. Application Data

(63) Continuation of application No. 09/079,539, filed on May 15, 1998, now abandoned.

(51) Int. Cl.
*C12H 1/02* (2006.01)
(52) U.S. Cl. .................. 426/330.4; 426/422; 426/423; 426/442
(58) Field of Classification Search ............. 426/330.4, 426/422, 423, 442
See application file for complete search history.

(56) References Cited

U.S. PATENT DOCUMENTS 4,636,394 A * 1/1987 Hsu ........................ 426/330.4
4,975,405 A * 12/1990 Okamura et al. ........... 502/233
5,149,553 A * 9/1992 Berg et al. ................ 426/330.4

* cited by examiner

*Primary Examiner*—Milton I. Cano
*Assistant Examiner*—Adepeju O. Pearse
(74) *Attorney, Agent, or Firm*—William J. Davis; Walter Katz (57) ABSTRACT

A premix composition for clarifying beverages like beer includes, by weight, (a) about 40 to 90%, preferably 60–85%, of silica xerogel having less than 10% water therein, preferably 5% or less, and a particle size, as defined by its mean volume average diameter MV, in both the dry state and as a 10% aqueous slurry, of less than 50μ, preferably about 5–30μ, and (b) about 10 to 60%, preferably 15–40%, of crosslinked polyvinylpyrrolidone having a particle size as defined, in the dry state, of about 10 to 50μ, and about 30–60μ in a 10% aqueous slurry, and a process of obtaining, chill-haze stabilized beer with substantial reduction in high molecular weight proteins, as well as polyphenols, flavanoids and tannins, in an efficient and effective single-step process at a rapid filter-flow rate, with undetectable residual soluble plyvinylpyrrolidone thereafter, and no microbiological growth in the premix, effective haze stability after time, and advantageous redispersibility of the premix used in the process.

3 Claims, 1 Drawing Sheet

PREMIX COMPOSITION FOR CLARIFYING BEER

This is a continuation, of application Ser. No. 09/079,539, filed on May 15, 1998, now abandoned.

BACKGROUND OF THE INVENTION

1. Field of the Invention

This invention relates to clarification of beverages such as beer and wine, and, more particularly, to a premix composition and process for effecting such clarification in an efficient and advantageous single-step process.

2. Description of the Prior Art

Non-biological haze in unstabilized beer arises from complexation of haze-sensitive proteins and haze-producing polyphenols and tannoids. Accordingly, silica gels such as hydrogel or xerogel have been used for effecting clarification of beer by adsorbing haze-sensitive proteins. However, silica hydrogel contains greater than 30% water and is therefore prone to microbial growth on storage. Silica xerogel contains only 5% water but becomes compacted upon hydration. Crosslinked polyvinylpyrrolidone (PVPP) also has been effective for treating unstabilized beer by specific adsorption of condensed and polymeric polyphenols and tannoids present in beer. Sequential treatments with silica gels and PVPP have been used with some measure of success. Combinations of silica hydrogel and PVPP for a single treatment process have been considered but when hydrated such an admixture becomes voluminous and clumpy making it difficult to pump homogeneously. Similarly, the industry has warned that xerogel and PVP should never be present simultaneously, as they may neutralize each other's effects.

The prior art is represented by the following U.S. Pat. Nos.: 2,316,241; 3,117,004; 3,163,538; 3,413,120; 3,512,987; 3,554,759; 3,617,301; 3,818,111; 3,903,316; 4,166,141; 4,820,420; 4,910,182; and by the following, foreign patents and technical publications:

(1) Gorinstein, S et al, J of Food Biochemistry 14, 161–172 (1990).
(2) Boschet, G. Brauindustrie 70 (16) 1441–4 (1985).
(3) McMurrough, I. et al J. Am. Soc. Brewing Chemists 50 (2) 67–76 (1992).
(4) GB 1,151,476 ('69) Deutsche Gold (silica+PVP).
(5) Weyh, H. Inst. Chem. Tech. Anal. Chem. 8050 (1987).
(6) Boschet, G. Bios (Nancy) 17 (8–9) 49–52 (1986).
(7) Birkner, F. EPA 183162 A2 Jun. 4, 1986 EP 85114640 (Nov. 18, 1985).
(8) Hums, N. DE 3509892A1 Sep. 25, 1986.
(9) Buchvarov, V. Monatsschr. Brauwiss 39 (5) 188–92 (1986)
(10) Wackerbauer, K. Monatsschr. Brauwiss 37 (5) 201–7 (1984).
(11) Chi, C. W. DE 3302258A1 Jan. 25, 1983.
(12) Jaeger, P. Mitt. Versuchsstn Gaerungsgewerke Wien 34 (9–10) 83–9 (1980).
(13) Sfat, M. R. Tech. Q, Master Brew Assn Am 12 (4) 243–8 (1975)
(14) Silbereisen, K. Monatsschr. Brauwiss 21 (8) 221–35 (1968).
(15) Schafft, H. Brauwelt 117 (36) 3–7 (1977).
(16) Blecher, L. Brew. Dig, 51 (7) 33–5, 44 (1976).
(17) Grace, DE 3302258A1 (1983).
(18) Chi, C. W. Can. Pat. 1,178,222.
(19) Suhner, Ger. Pat. Publicn. 1907610, C.A. 75, October 1972 (p. 2/6) QD 1A5.

However, none of these references disclose a composition for clarifying beer or wine in an efficient and advantageous manner with a premix composition of a silica xerogel having defined characteristics present in a predetermined amount with a crosslinked polyvinyl lactam polymer.

Accordingly, it is an object of the present invention to provide a new and improved premix composition of a siliceous material and crosslinked polyvinylpyrrolidone for use in clarification of beer or wine.

Another object herein is to provide a stable premix composition for clarification of beer or wine which has a long shelf life and is not prone to microbiological contamination.

Still another object of the invention is to provide a stable premix composition of a siliceous material and a crosslinked polyvinyl lactam which is effective for colloidal stabilization of beer.

Among the other objects herein is to provide such a premix composition which can efficiently remove sensitive proteins, polyphenols, flavanoids and tannoids from beer, and to effect a substantially complete reduction in chill haze in the beer.

Yet another object herein is to provide a process for colloidal stabilization of beer in a single dosing and a single filtration operation.

A specific object herein is to provide a stable premix composition which is selective to removal of high molecular weight proteins while leaving the desirable low molecular weight proteins remaining in the clarified beer.

A feature of the present invention is the provision of a stable premix of predetermined composition which is a siliceous xerogel material having less than about 10% by weight of water therein, and a particle size as defined by its mean volume average diamter, Mv, of less than 50μ, both in the dry state and as a 10% aqueous slurry, and a crosslinked polyvinyl lactam, preferably crosslinked polyvinylpyrrolidone (PVPP), in a weight ratio of about 40 to 90% of the xerogel to about 10 to 60% of PVPP, for effective clarification of beer.

These and other objects and features of the invention will be made apparent from the following description of the invention.

SUMMARY OF THE INVENTION

What is described herein is a premix composition for clarifying beer in an effective manner which comprises, by weight, (a) 40 to 90% silica xerogel having less than 10% water therein, preferably 5% or less, and (b) 10 to 60% by weight of crosslinked polyvinylpyrrolidone (PVPP). Preferably, (a) is 60 to 85% and (b) is 15 to 40%; most preferably, (a) is 70 to 80% and (b) is 20 to 30%.

In this invention, (a) has a particle size as defined by its mean volume average diamter, Mv, in both the dry state and as a 10% aqueous slurry, of less than 50μ, preferably about 5–30μ, component (b) has a defined particle size in the dry state of about 20 to 50μ, and, in a 10% aqueous slurry, of about 30 to 90μ.

A premix composition wherein prior to admixture, the ratio between the particle sizes of (a) in a 10% aqueous slurry to its dry state is about 2.0.

A premix composition wherein prior to admixture, the ratio between the particle sizes of (b) in a 10% aqueous slurry to the dry state is about 2.0.

A premix composition wherein the particle size, as defined by its mean volume average diameter, Mv, of (a) is less than the correspondingly defined particle size of (b).

A feature of the invention is the provision of a flocculated aqueous slurry of the defined premix composition, preferably including about 5 to about 20% by wt. of the premix composition and about 80 to about 95% water, for example, which is prepared by admixing silica xerogel and PVPP in defined proportions, and slowly adding water thereto with agitation.

Another feature of the invention is the provision of a process for clarifying beer which includes treating beer with such an agitated flocculated aqueous slurry of the defined premix, and filtering the thus-treated beer, wherein both proteins and polyphenols are removed in one step from the treated beer in a contact time of about 3 hours or less. Such a process requires only a dose of about 10 lbs. of the premix composition for each 100 barrels of beer. The process also features a step of conveniently pumping both the clarified beer and the spent premix composition out of the treatment tank into a filter tank after carrying out the clarification step.

The clarified beer or wine is obtained herein in a process which is conducted at an advantageous filter flow rate, with undetectable residual soluble polyvinylpyrrolidone therein, and no biological growth in the premix, with effective haze stability after time, and easy redispersibility of the used premix.

DETAILED DESCRIPTION OF THE INVENTION

Silica gel is produced by reacting sodium silicate with sulfuric acid. The gel then is broken up, washed and sized. This product is known as silica "hydrogel". Sodium sulfate is a by-product of the process of formation of silica hydrogel. When sodium sulfate is removed from silica hydrogel and the residue is dried to less than 10% water therein, a silica product known as "xerogel" is obtained.

In this invention, a stable premix composition is provided which includes a predetermined composition of xerogel having less than 10% water therein, preferably 5% or less. Suitable xerogels for use herein include SIL-Proof® BG-5 and BG-6 (SCM Chemicals); Britesorb® D-300 (PQ Corp.), and Lucilite XLC (Crossfield Corp.).

The other component of the premix composition is crosslinked polyvinylpyrrolidone (PVPP), such as Polyclar® PC-10, which is available from International Specialty Products, Inc. (ISP).

In accordance with the present invention, the premix composition for colloidal stabilization of beer is prepared by admixing xerogel and crosslinked polyvinylpyrrolidone (PVPP) solids.

Suitable premix compositions in accordance with the invention contain about 40 to 90% by weight of xerogel, preferably 60 to 85%, and most preferably about 70–80%; and about 10 to 60% of PVPP, preferably about 15 to 40%, and most preferably about 20 to 30%.

In the premix composition, the xerogel component provides the larger surface area to receive the PVPP component in a predetermined ratio without causing compactation of the resultant admixture. Accordingly, suitable xerogel: PVPP wt. ratios in the premix composition generally will depend upon the particle size of the xerogel used therein. Suitable specific premix compositions herein include, for example, 83% xerogel and 17% PVPP (a 15:3 wt. ratio); 70% xerogel and 30% PVPP (a 7:3 wt. ratio); and 63% xerogel with 37% PVPP (a 1.7:1 wt. ratio). In the preferred forms of the invention, the xerogel component of the premix should have a smaller particle size than the PVPP so that it can be complexed between the PVPP particles.

The premixed composition can be stored in a stable condition for prolonged periods of time with minimal chance of microbial contamination. Before use, the premix composition must be hydrated with water with agitation to form an aqueous dispersion or slurry having a premix concentration of about 5–20 wt. %. In this aqueous dispersion, PVPP stabilizes the xerogel by flocculating the xerogel without affecting the requisite adsorbing characteristics of each material. This flocculated, aqueous dispersion then is used in a single-step treatment of unstabilized beer. During this treatment, the flocculated premix in the dispersion remains in the slurry state without any significant compaction.

This stable, flocculated aqueous premix slurry is achieved herein because its PVPP component quickly hydrates upon addition of water thereto to form a swelled system.

The swelled PVPP system immediately complexes the xerogel component to prevent premature compaction of the system while the xerogel becomes fully hydrated. Then, in this complexed condition, the xerogel can become fully hydrated by addition of water to the premix over a long period of time without causing compaction of the system.

Suitably, the solid premix composition of the invention is hydrated with water for about 3 hours to form a thick, flocculated aqueous slurry containing about 5–20 wt. % of the premix. This flocculated composition can be kept in a holding tank for long periods without affecting the clarifying properties of either component, and with advantageous microbiological stability.

The flocculated hydrated premix slurry thus-prepared then is pumped into the beer treatment tank where it can perform its clarifying and chill haze stability functions. After treatment, the clarified beer is pumped into a filter tank where the stabilized beer is passed through a cake of diatomaceous earth to remove any traces of the premix remaining in the beer. Alternate filtration systems like ceramic candles, membrane filtration or centrifugation can be used in the place of diatomaceous earth filtration.

In a typical run, 18 lbs. of the premix composition of the invention at a 15:3 wt. ratio of xerogel to PVPP is used for each 100 barrels of unstabilized beer. This single step treatment produces stabilized beer with a prolonged shelf life as a result of an efficacious removal of sensitive proteins and haze-making polyphenols.

While the mechanism of action of the xerogel and PVPP components of the premix upon each other is not completely understood at present, it is believed that the water-insoluble polymeric PVPP component is a microcrystalline system which can hydrogen bond or complex to the xerogel via water bridges without penetration to prevent the xerogel from settling out.

The PVPP also provides a matrix for simultaneous adsorption of polyphenols and high molecular weight proteins onto the xerogel by a process of diffusion, attachment and penetration.

The advantageous clarification results are achieved herein in a single dosing step with about a 2–30 minute contact time with the two component premix composition of the invention, and with only a single filtration step, operating with an efficient Filter Index, i.e. less pressure build-up across the filter, less diatomaceous earth (DE) in the filtration step and a greater beer volume throughput through the filter. The stabilized and filtered beer obtained herein had a shelf-life of greater than 3 months, which was over 3 times that of beer treated with either single component of the premix, and equal to sequential single treatments with each component.

Figure 1:
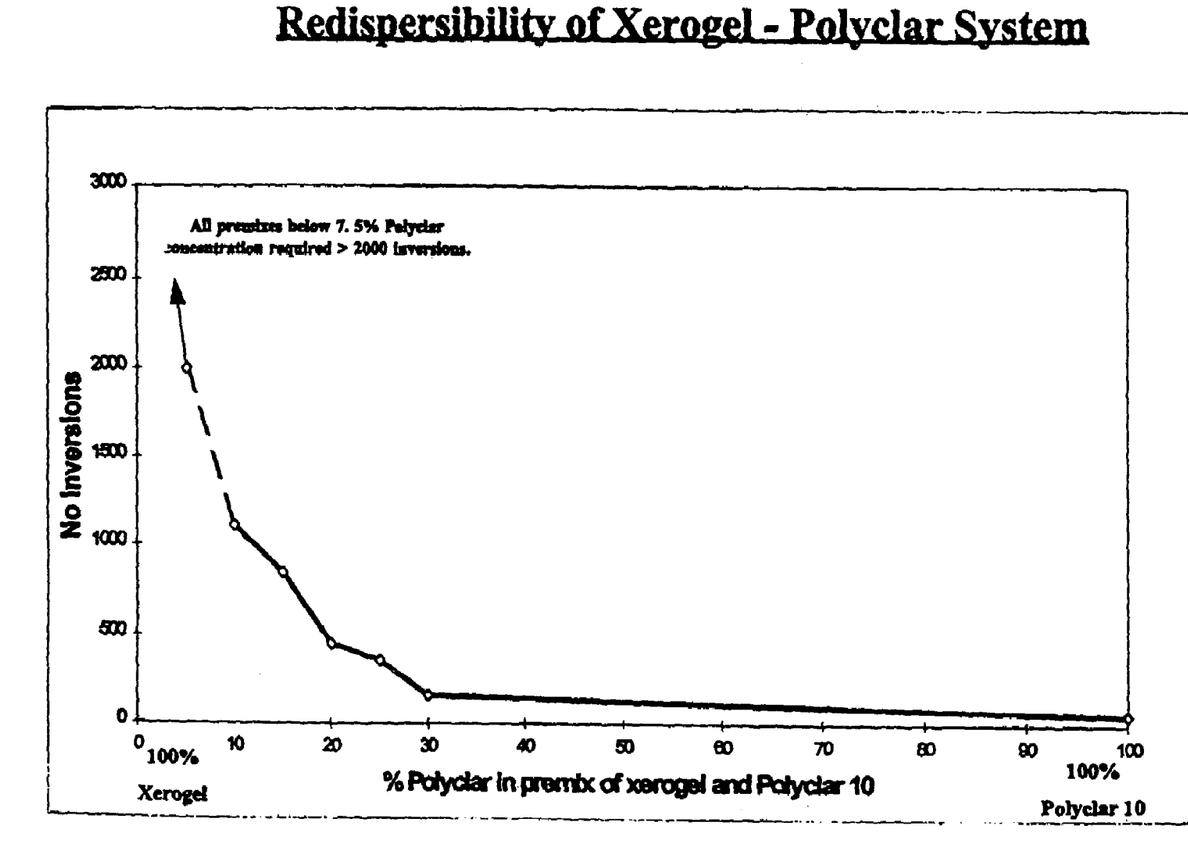
The FIGURE is a graphical representation of dispersibility of premix compositions of silica xerogel and PVPP as a function of composition.

The FIGURE shows the effective dispersibility of xerogel and PVPP premix systems as a function of its composition. The degree of dispersibility in an aqueous premix at a 10–20 wt. % concentration is inversely related to the number of inversions required to redisperse a slurry of given composition which has stood for 24 hours. Suitable premix compositions require less than 1000 inversions, preferably less than 500 inversions, and, most preferably less than 100 inversions. As is seen therein, these properties are achieved in premix compositions which contain about 10–60% by weight PVPP (Polyclar 10), preferably 15-40%, and, most preferably, about 20–30%, the rest being the defined silica xerogel component.

EXAMPLES

Methods of Analysis

Tannoid Content (Tannometer)

Tannoids are defined as those fractions of the polyphenolic compounds that can be precipitated by the addition of PVP K90 to the beer sample. They include the low and medium molecular weight polyphenols. The haze in beer is fundamentally a complex between the condensed polyphenols, referred to as TANNOIDS (T), and the SENSITIVE PROTEINS (P), in an equilibrium governed by the law of mass action as shown in equation (1) and equation (2):

$$P + T \rightleftharpoons PT \quad (1)$$

so that $$[P] \times [T] = k[PT] \quad (2)$$

where [P] is the concentration of polypeptides and proteins (Sensitive Proteins defined as substances giving haze when tannin is added) and [T] is the concentration of tannoids that form precipitate with PVP K 90 (molecular weight 350,000).

For the analysis of Tannoids, a solution of PVP K90 was injected into a beer sample. The Tannoids in the beer form a precipitate with PVP K90 through hydrogen bonding. The addition of PVP K90 is plotted against the formation of haze and the maxima of the peak gives the Tannoid Content expressed as mg PVP/L beer.

A lower value of tannoids in the treated beer indicates a reduction in haze.

Sensitive Proteins (Tannometer)

The sensitive protein test via the Tannometer provides insight to the levels of haze forming proteins present in beer. In this test, a solution of tannic acid was dosed into a beer sample. Proteins in the beer complex with tannin to form an insoluble PT complex giving rise to haze. The result is expressed in EBC units of haze corresponding to the addition of 10 mg of tannin per liter of beer.

A lower value of sensitive proteins in the treated beer indicates a reduction in haze.

Flavanoids and Polyphenols

The flavanoid content in beer samples was analyzed by Analytica EBC, method 9.9.2. Total polyphenols in beer is analyzed using Methods of Analysis of ASBC, method BEER-35. Both methods give an absorbance value measured by a spectrometer and the results are expressed in ppm. HPLC with dual-electrode offers a precise qualitative and quantitative method for the determination of haze producing flavanols in beer.

The flavanoid/polyphenols in beer are of two-fold interest, owing to their proven involvement in haze formation and their potential impact on flavor. Malt and hops provide beer with its share of the polyphenols.

The absence of protective groups on the hydroxylated flavanoid matrix is the reason why these polyphenols can react with proteins thereby causing colloidal instability in beer. Also, associated with polyphenols is the characteristic astringent flavors in beer. The anthocyanogens which are part of the polyphenols can easily be hydrolyzed to anthocyanidin. These anthocyanidins give beer harsh and astringent flavors. Polyclar adsorbs these anthocyanogens thereby reducing the formation of astringency in beer.

Total Haze and Aging Test

The total haze is read directly from the bottle, using an Lg automatic haze meter. The haze meter is calibrated with certified haze standards obtained from Advanced Polymer Systems. All readings are taken with distilled water in the measuring chamber to prevent the formation of condensation on the outside surface of cold samples.

Haze readings are taken on fresh beer samples at 22° C. and at 0° C. Aging tests are performed by incubating samples in a dry oven at 37° C. for one week and then transferring to storage at 0° C. for one day before taking total haze readings on the cold samples. Samples are put through this cycle for several weeks or until an excessive value for haze is obtained. The end of useful shelf life is generally taken to be 2.0 EBC haze units and one week storage at 37° C. is taken as being equal to one-month storage at ambient temperature.

RUNS 1–8

Examples 1–8

Runs 1–8 are Lab Runs.
Runs 1, 2, 3, 4 are Comparative Runs.
Runs 5 and 6 are Invention Runs.
Runs 7 and 8 are Control Runs.

Double Filtration—Filtration After Sequential Addition of Each Component

Run No. 1

A sample of unstabilized beer was obtained from a commercial source (Anheuser-Busch, Newark, N.J.) and used for Examples 1 through 7. This beer sample was not treated with any form of stabilizer and was centrifuged to decrease yeast cell count to approximately 1 million cells per ml by the brewery. In a 1500-ml glass jar equipped with a lid was added 1000-ml of unstabilized beer, 0.571 g (equivalent to a dosing rate of 15-lbs/100 bbl) of Xerogel (Britesorb D-300, PQ Corporation) and a magnetic stir bar. This mixture was placed on a magnetic stir plate within a refrigerator, set at 0° C. After 3 hours of stirring, 1.90 g of diatomaceous earth (DE) was added (equivalent to 50-lbs/100 bbl) and mixed into the solution by swirling the jar. This mixture was then vacuum filtered through a 2.5-μm glass fiber filter using a Buchner funnel and vacuum flask. To the filtrate was added 0.114 g of Polyclar®10 (equivalent to 3-lbs/100 bbl) and mechanically stirred at 0° C. for 15 minutes. 1.90 g of DE was again added and mixed into solution and filtered as previously described.

The clear filtered beer was analyzed for tannoid content, sensitive proteins, total polyphenols, flavanoids, and also subjected to heat forcing tests to determine colloidal stability, described under "Methods of Analysis". Results can be found in Tables 1, 2 and 3.

Run No. 2

Run 1 was repeated except that 0.267 g of Polyclar®10 (equivalent to 7-lbs/100 bbl) was added in place of 0.114 g of Polyclar®10 after the first filtration process. Results can be found in Tables 1, 2 and 3.

Single Filtration—Sequential Addition of Components

Run No. 3

In an experiment similar to that performed in Example 1, a 1000-ml sample of unstabilized beer was dosed with 0.571 g of Xerogel (Britesorb D-300, equivalent to 15-lbs/100 bbl) and mechanically stirred for 2¾ hours. Then, 0.114 g of Polyclar®10 (equivalent to 3-lbs/100 bbl) was added to the mixture and stirred for an additional 15 minutes. DE was dosed into the sample and the mixture was filtered as described in Example 1. Results can be found in Tables 1, 2 and 3.

Run No. 4

Example 3 was repeated except that 0.267 g Polyclar 10 (equivalent to 7-lbs/100 bbl) was used in the place of 0.114 g of Polyclar®10. Results can be found in Tables 1, 2 and 3.

Premix of Components—Single Filtration

Run No. 5

In an experiment similar to that performed in Example 1, Xerogel (Britesorb D-300) and Polyclar®10 were premixed in the ratio of 15:3 by weight. A 1000-ml sample of unstabilized beer was dosed with 0.685 g of the 15:3 ratio premix (equivalent to 18-lbs/100 bbl). The sample was placed on a magnetic stir plate within a refrigerator, set at 0° C. After 3 hours of stirring, 1.90 g of diatomaceous earth (DE, equivalent to 50-lbs/100 bbl) was added and mixed into the solution by swirling the jar. This mixture was then vacuum filtered through a 2.5-µm glass fiber filter using a Buchner funnel and vacuum flask. The filtered beer was then analyzed as described in Example 1. Results can be found in Tables 1, 2 and 3.

Run No. 6

Example 5 was repeated except that Xerogel (Britesorb D-300) and Polyclar®10 were premixed in the ratio of 15:7 by weight. A 1000-ml sample of beer was dosed with 0.838 g of the 15:7 ratio premix (equivalent to 22-lbs/100 bbl) and processed as described in Example 5. Results can be found in Tables 1, 2 and 3.

Control Sample (Treated with Xerogel Alone or Untreated) for Examples 1 Through 6

Run No. 7

A control experiment was performed by dosing 1000-ml of unstabilized beer with 0.157 g of Xerogel (Britesorb D-300, equivalent to 15-lbs/100 bbl). The mixture was mechanically stirred for 3 hours in a refrigerator, set at 0° C. 1.90 g of diatomaceous earth (DE) was added to the mixture (equivalent to 50-lbs/100 bbl) and mixed into the solution by swirling the jar. This mixture was then vacuum filtered through a 2.5-µm glass fiber filter using a Buchner funnel and vacuum flask. The filtered beer was then analyzed as described in Example 1. Results can be found in Tables 1, 2 and 3.

Run No. 8

A second control experiment was performed using 1000-ml of unstabilized beer with no form of beer stabilizer added. The beer was mechanically stirred for 3 hours in a refrigerator, set at 0° C. 1.90 g of diatomaceous earth (DE) added to the beer (equivalent to 50-lbs/100 bbl) and into solution by swirling the jar. This mixture was vacuum filtered through a 2.5-µm glass fiber filter a Buchner funnel and vacuum flask. The filtered beer then analyzed as described in Example 1. Results can be in Tables 1, 2 and 3.

TABLES 1–3

| | Dosing Rates | | | | Quantity | | |
|---|---|---|---|---|---|---|---|
| Run | Xerogel (Britesorb D-300) (lbs/100 bbl) | Polyclar ® 10 (lbs/100 bbl) | DE (lbs/100 bbl) | Amount of Beer (ml) | Xerogel (Britesorb D-300) (g) | Polyclar ® 10 (g) | DE (g) |
| 1 | 15 | 3 | 50 | 1000 | 0.571 | 0.114 | 1.904 |
| 2 | 15 | 7 | 50 | 1000 | 0.571 | 0.267 | 1.904 |
| 3 | 15 | 3 | 50 | 1000 | 0.571 | 0.114 | 1.904 |
| 4 | 15 | 7 | 50 | 1000 | 0.571 | 0.267 | 1.904 |
| 5 | 15 | 3 | 50 | 1000 | 0.571 | 0.114 | 1.904 |
| 6 | 15 | 7 | 50 | 1000 | 0.571 | 0.267 | 1.904 |
| 7 | 15 | 0 | 50 | 1000 | 0.571 | 0 | 1.904 |
| 8 | 0 | 0 | 50 | 1000 | 0 | 0 | 1.904 |

TABLE 2

| Run | Tannoids (mg/L) | Sensitive Proteins (EBC at 10 mg/L beer) | Total Polyphenols (mg/L) | Flavanoids (mg/L) |
| --- | --- | --- | --- | --- |
| 1 | 15.9 | 0.4 | 168.1 | 34.8 |
| 2 | 0.0 | 0.4 | 135.3 | 28.5 |
| 3 | 13.0 | 0.6 | 177.1 | 34.8 |
| 4 | 0.0 | 0.8 | 150.1 | 28.8 |
| 5 | 15.5 | 0.6 | 169.7 | 32.5 |
| 6 | 0.0 | 1.1 | 143.5 | 28.8 |
| 7 | 32.6 | 0.7 | 206.6 | 37.5 |
| 8 | 37.5 | 4.3 | 214.8 | 38.9 |

TABLE 3*

| Run | Initial (EBC) | Week 1 (EBC) | Week 2 (EBC) | Week 3 (EBC) | Week 4 (EBC) |
| --- | --- | --- | --- | --- | --- |
| 1 | 0.83 | 5.82 | 8.26 | 12.56 | 17.56 |
| 2 | 0.82 | 2.61 | 4.68 | 6.32 | 10.28 |
| 3 | 1.45 | 4.93 | 7.26 | 11.46 | 17.82 |
| 4 | 1.42 | 2.81 | 4.52 | 6.18 | 11.25 |
| 5 | 1.43 | 5.68 | 7.10 | 12.86 | 17.10 |
| 6 | 1.22 | 2.86 | 4.73 | 6.08 | 11.23 |
| 7 | 1.65 | 10.58 | 15.60 | 16.58 | >18.00 |
| 8 | 4.57 | >18.00 | >18.00 | >18.00 | >18.00 |

*Haze measurements, samples heat forced at 37° C., measurements taken at 0° C.

Example 9

Large Scale Trial

Runs 9a, 9b and 9c

In separate experiments, 36,000 gallons of unstabilized beer was treated at 20-lbs/100 bbl with Xerogel (Britesorb D-300, Control Example 9a), 15-lbs/100 bbl with Xerogel (Millennium BG6, Example 9b), and 10 lbs/100 bbl with a 7:3 ratio by weight of Xerogel (Millennium BG6) and Polyclar 10 (Example 9c). The treatments were followed by dosing of DE at 50-lbs/100 bbl (as body feed) and filtered. Results of analysis can be found in Tables 4, 5 and 6.

Example 9c was more homogeneous and easier to dose into the beer than Examples 9a and 9b. Example 9c also emptied quite easily from the slurry tank in comparison to Examples 9a and 9b, which compacted solidly at the bottom of the tank.

Filter index for Example 9c was found to be four times better than Example 9b and 2 times better than Example 9a. Filter index is an operational parameter that measures the efficiency of large-scale beer filtration. The value is based on filter pressure, amount of DE used, and the rate of filtration.

TABLE 4

| Run | Treatment |
| --- | --- |
| 9a | Britesorb D-300 at 20-lbs/100 bbl |
| 9b | Millennium BG6 at 15-lbs/100 bbl |
| 9c | 7:3 ratio by weight of a Premix of Xerogel (Millennium BG6) and Polyclar 10 at 10-lbs/100 bbl |

TABLE 5

| Run | Tannoids (mg/L) | Sensitive Proteins (EBC at 10 mg/L beer) | Total Polyphenols (mg/L) | Flavanoids (mg/L) |
| --- | --- | --- | --- | --- |
| 9a | 33.0 | 0.3 | 141.0 | 31.5 |
| 9b | 28.6 | 0.6 | 143.5 | 31.5 |
| 9c | 18.9 | 0.5 | 126.3 | 25.5 |

TABLE 6

| Run | Initial Total (EBC) | Week 1 Total (EBC) | Week 2 Total (EBC) | Week 3 Total (EBC) | Week 4 Total (EBC) |
| --- | --- | --- | --- | --- | --- |
| 9a | 0.54 | 1.04 | 1.35 | 3.10 | 4.50 |
| 9b | 0.86 | 1.50 | 2.36 | 3.96 | 6.46 |
| 9c | 0.62 | 0.80 | 1.52 | 2.01 | 3.60 |

The advantages of the combined treatment at 10-lbs/100 bbl, Invention Run 9c, over treatment with xerogel alone at 15-lbs/100 bbl and 20 lbs/100 bbl, Runs 9a and 9b, respectively, is clearly evident by the low value of total haze in EBC units.

Example 10

Premix of Components

Xerogel (Millennium BG5) and Polyclar®10 were premixed in the ratio of 7:3 by weight. A 1000-ml sample of a new unstabilized beer was dosed with 0.381 g of the 7:3 ratio premix (equivalent to 10-lbs/100 bbl). The sample was mechanically stirred using a magnetic stir plate within a refrigerator, set at 0° C. After 3 hours of stirring, 1.90 g of diatomaceous earth (DE, equivalent to 50-lbs/100 bbl) was added and mixed into the solution by swirling the jar. This mixture was then vacuum filtered through a 2.5-μm glass fiber filter using a Buchner funnel and vacuum flask. The filtered beer was then analyzed as described in Example 1. Results can be found in Tables 7 and 8 below.

Example 11

Premix of Components

Example 10 was repeated except that the 7:3 premix was dosed at 0.571 g (equivalent to 15-lbs/100 bbl). Results can be found in Tables 7 and 8.

Example 12

Polyclar®10 Treatment

In an experiment similar to Example 11, a 1000-ml sample of unstabilized beer was dosed with 0.114 g of Polyclar®10 (equivalent to 3-lbs/100 bbl) in place of the premix. Results can be found in Tables 7 and 8.

Example 13

Xerogel Treatment

Example 12 was repeated except that 0.762 g of Xerogel (Millennium BG5, equivalent to 20-lbs/100 bbl) was used in place of Polyclar®10. Results can be found in Tables 7 and 8.

Example 14

Xerogel Treatment—Control for Examples 10 Through 13

Example 12 was repeated except that 0.571 g of Xerogel (Millennium BG5, equivalent to 15-lbs/100 bbl) was used in of Polyclar®10. Results can be found in Tables 7 and 8.

TABLE 7

| Example | Tannoids (mg/L) | Sensitive Proteins (EBC at 10 mg/L beer) | Total Polyphenols (mg/L) | Flavanoids (mg/L) |
|---|---|---|---|---|
| 10 | 15.5 | 0.4 | 151.7 | 27.9 |
| 11 | 15.2 | 0.4 | 130.4 | 23.6 |
| 12 | 14.5 | 1.8 | 151.7 | 27.5 |
| 13 | 32.2 | 0.2 | 190.2 | 37.2 |
| 14 | 32.0 | 0.2 | 189.4 | 36.2 |

TABLE 8

| Example | Initial Total (EBC) | Week 1 Total (EBC) | Week 2 Total (EBC) | Week 3 Total (EBC) |
|---|---|---|---|---|
| 10 | 0.64 | 1.39 | 3.75 | 6.24 |
| 11 | 0.65 | 1.17 | 2.68 | 4.65 |
| 12 | 0.68 | 4.79 | 6.44 | 8.60 |
| 13 | 0.92 | 3.15 | 8.60 | 14.40 |
| 14 | 0.65 | 4.00 | 10.19 | 16.42 |

Invention Example 11 produced distinctly superior haze stability.

Example 15

Premix of Components

Example 10 was repeated except that xerogel, Lucilite XLC (Crossfield Corp.) was used in place of Xerogel, Millennium BG5. Results can be found in Tables 9 and 10.

Example 16

Premix of Components

Example 11 was repeated except that Xerogel, Lucilite XLC (Crossfield Corp.) was used in place of Xerogel, Millennium BG5. Results can be found in Tables 9 and 10.

Example 17

Polyclar®10 Treatment

Example 12 was repeated. Results can be found in Tables 9 and 10.

Example 18

Xerogel Treatment

Example 13 was repeated except that Xerogel, Lucilite XLC (Crossfield Corp.) was used in place of Xerogel, Millennium BG5. Results can be found in Tables 9 and 10.

Example 19

Xerogel Treatment—Control for Examples 15 Through 18

Example 14 was repeated except that Xerogel, Lucilite XLC (Crossfield Corp.) was used in place of Xerogel, Millennium BG5. Results can be found in Tables 9 and 10.

TABLE 9

| Example | Tannoids (mg/L) | Sensitive Proteins (EBC at 10 mg/L beer) | Total Polyphenols (mg/L) | Flavanoids (mg/L) |
|---|---|---|---|---|
| 15 | 13.1 | 0.3 | 148.4 | 25.8 |
| 16 | 12.1 | 0.2 | 134.5 | 23.5 |
| 17 | 13.0 | 2.9 | 149.2 | 26.1 |
| 18 | 31.1 | 0.2 | 188.6 | 36.5 |
| 19 | 31.2 | 0.2 | 189.4 | 37.5 |

TABLE 10

| Example | Initial Total (EBC) | Week 1 Total (EBC) | Week 2 Total (EBC) | Week 3 Total (EBC) |
|---|---|---|---|---|
| 15 | 0.44 | 2.01 | 6.69 | 10.63 |
| 16 | 0.43 | 1.12 | 3.82 | 6.39 |
| 17 | 0.51 | 6.87 | 10.20 | 12.34 |
| 18 | 0.56 | 3.32 | 10.30 | 15.32 |
| 19 | 0.45 | 4.91 | 14.61 | 16.42 |

Example 16 produced far superior stabilization (lower total EBC value) than Comparative Runs 17–19.

Example 20

Sedimentation Properties of Polyclar®10

To a 100 ml stoppered graduated cylinder was added log of Polyclar®10 and a quantity of distilled water to bring the total volume of the mixture to 100 ml. The sample was thoroughly mixed to disperse the solids and allowed to stand overnight to fully hydrate. The mixture was then re-mixed by vigorous inversion of the cylinder to fully disperse the solids. The volume of settled solids was noted after 15 min., 30 min., 1 hour, 3 hours, 6 hours, and 24 hours of settling time. Results are found in Table 11.

Example 21

Sedimentation Properties of Xerogel (Millennium BG6)

Example 20 was repeated except that 10 g of Xerogel (Millennium BG6) was used in place of Polyclar®10. Results are tabulated in Table 11.

Example 22

Sedimentation Properties of Xerogel (Millennium BG5)

Example 20 was repeated except that 10 g of Xerogel (Millennium BG5) was used in place of Polyclar®10. Results are tabulated in Table 11.

Example 23

Sedimentation Properties of Xerogel (Crossfield. Lucilite XLC)

Example 20 was repeated except that log of Xerogel (Crossfield, Lucilite XLC) was used in place of Polyclar®10. Results are tabulated in Table 11.

Example 24

Sedimentation Properties of Polyclar®10/Xerogel (Millennium BG6) Mixture

Example 20 was repeated except that 10 g of Polyclar®10 was replaced with a solid premix containing 7 g of Xerogel (Millennium BG6) and 3 g Polyclar®10. Results are tabulated in Table 11.

Example 25

Sedimentation Properties of Polyclar®10/Xerogel (Millennium BG5) Mixture

Example 20 was repeated except that 10 g of Polyclar®10 was replaced with a solid premix containing 7 g of Xerogel (Millennium BG5) and 3 g Polyclar®10. Results are tabulated in Table 11.

Example 26

Sedimentation Properties of Polyclar®10/Xerogel (Crossfield, Lucilite XLC) Mixture

Example 20 was repeated except that 10 g of Polyclar®10 was replaced with a solid premix containing 7 g of Xerogel (Crossfield, Lucilite XLC) and 3 g Polyclar®10. Results are tabulated in Table 11.

Example 27

Sedimentation Properties of Polyclar®10/Xerogel (Millennium BG6) Mixture

Example 20 was repeated except that 8 g of Xerogel (Millennium BG6) and 2 g of Polyclar 10 were used. Results are tabulated in Table 11.

Example 28

Sedimentation Properties of Polyclar®10/Xerogel (Millennium BG5) Mixture

Example 20 was repeated except that 8 g of Xerogel (Millennium BG5) and 2 g of Polyclar 10 were used. Results are tabulated in Table 11.

Example 29

Sedimentation Properties of Polyclar®10/Xerogel (Crossfield, Lucilite XLC) Mixture

Example 20 was repeated except that 8 g of Xerogel (Crossfield, Lucilite XLC) and 2 g of Polyclar®10 were used. Results are tabulated in Table 11.

TABLE 11

| | Quantity of Components | | Level of Solids at Indicated Time (ml) | | | | | |
|---|---|---|---|---|---|---|---|---|
| Example | Xerogel (g) | Polyclar (g) | 15 (min) | 30 (min) | 1 (hr) | 3 (hr) | 6 (hr) | 24 (hr) |
| 20 | 0 | 10 | 99 | 98 | 97 | 97 | 95 | 55 |
| 21 | 10 (Millennium BG6) | 0 | 0.5 | 1 | 2 | 3 | 20 | 26 |
| 22 | 10 (Millennium BG5) | 0 | 16 | 20 | 23 | 29 | 30 | 31 |
| 23 | 10 (Lucilite XLC) | 0 | 95 | 92 | 88 | 35 | 36 | 36 |
| 24 | 7 (Millennium BG6) | 3 | 83 | 75 | 62 | 59 | 58 | 57 |
| 25 | 7 (Millennium BG5) | 3 | 86 | 78 | 76 | 73 | 72 | 71 |
| 26 | 7 (Lucilite XLC) | 3 | 96 | 95 | 95 | 95 | 93 | 93 |
| 27 | 8 (Millennium BG6) | 2 | 20 | 28 | 43 | 44 | 44 | 44 |
| 28 | 8 (Millennium BG5) | 2 | 28 | 40 | 50 | 49 | 49 | 47 |
| 29 | 8 (Lucilite XLC) | 2 | 88 | 81 | 81 | 80 | 75 | 74 |

The results established a reduced level of compacted solids for invention runs.

Example 30

Dispersion Properties of Polyclar®10

The sample from Example 20, after settling for 24 hours, was inverted up and down at the rate of about 60 inversions per minute. The number of inversions to re-disperse the solids was noted (each 180 degree rotation constitutes one inversion). Results are tabulated in Table 12.

Example 31

Sedimentation Properties of Xerogel (Millennium BG6)

The sample from Example 21, after settling for 24 hours, was inverted up and down and the number of inversions to re-disperse the solids is noted. Results are tabulated in Table 12.

Example 32

Sedimentation Properties of Xerogel (Millennium BG5)

The sample from Example 22, after settling for 24 hours, was inverted up and down and the number of inversions to re-disperse the solids is noted. Results are tabulated in Table 12.

Example 33

Sedimentation Properties of Xerogel (Crossfield, Lucilite XLC)

The sample from Example 23, after settling for 24 hours, was inverted up and down and the number of inversions to re-disperse the solids is noted. Results are tabulated in Table 12.

Example 34

Sedimentation Properties of Polyclar®10/Xerogel (Millennium BG6) Mixture

The sample from Example 24, after settling for 24 hours, was inverted up and down and the number of inversions to re-disperse the solids is noted. Results are tabulated in Table 12.

Example 35

Sedimentation Properties of Polyclar®10/Xerogel (Millennium BG5) Mixture

The sample from Example 25, after settling for 24 hours, was inverted up and down and the number of inversions to re-disperse the solids is noted. Results are tabulated in Table 12.

Example 36

Sedimentation Properties of Polyclar®10/Xerogel (Crossfield, Lucilite XLC) Mixture

The sample from Example 26, after settling for 24 hours, was inverted up and down and the number of inversions to re-disperse the solids is noted. Results are tabulated in Table 12.

Example 37

Sedimentation Properties of Polyclar®10/Xerogel (Millennium BG6) Mixture

The sample from Example 27, after settling for 24 hours, was inverted up and down and the number of inversions to re-disperse the solids is noted. Results are tabulated in Table 12.

Example 38

Sedimentation Properties of Polyclar®10/Xerogel (Millennium BG5) Mixture

The sample from Example 28, after settling for 24 hours, was inverted up and down and the number of inversions to re-disperse the solids is noted. Results are tabulated in Table 12.

Example 39

Sedimentation Properties of Polyclar®10/Xerogel (Crossfield, Lucilite XLC) Mixture

The sample from Example 29, after settling for 24 hours, was inverted up and down and the number of inversions to re-disperse the solids is noted. Results are tabulated in Table 12.

TABLE 12

| | Quantity | | |
| --- | --- | --- | --- |
| Example | Xerogel (g) | Polyclar (g) | # of Inversions |
| 30 | 0 | 10 | 57 |
| 31 | 10 (Millennium BG6) | 0 | >2000 |
| 32 | 10 (Millennium BG5) | 0 | 1700 |
| 33 | 10 (Lucilite XLC) | 0 | 250 |
| 34 | 7 (Millennium BG6) | 3 | 160 |
| 35 | 7 (Millennium BG5) | 3 | 44 |
| 36 | 7 (Lucilite XLC) | 3 | <40* |
| 37 | 8 (Millennium BG6) | 2 | 450 |
| 38 | 8 (Millennium BG5) | 2 | 80 |
| 39 | 8 (Lucilite XLC) | 2 | 150 |

The above data shows that the premix considerably reduced the number of inversions necessary to flocculate the sample, as compared to a single component.

Example 40

Filter Flow Rate Properties of Polyclar® 10/Xerogel

The following twelve admixtures were prepared by blending xerogel (Britesorb D-300) and increasing quantities of Polyclar 10 containing the following weight % of Polyclar 10. 0%, 8%, 16%, 25%, 30%, 32%, 42%, 50%, 65%, 75%, 85% and 100%. This was carried out by mixing the components in a V-blender for a period of 60 minutes. The filter flow rates for the flow of water over a filter bed prepared from the above admixtures were determined as follows.

4.00 g of different admixtures (premix in samples) were separately mixed (hydrated) in 200 ml of distilled water for 24 hours and then the Filter Flow Rate Index determined using Schenk pressure filter apparatus. Filter bed was established with the experimental premix in test, and then the time required for 100 ml of water to pass through the bed was measured with the a stop watch in seconds. (at 20° C., pressure of 0.2 bar, filter diameter 60 mm, type of filter Schenk D filter Mat). The Filter Flow Rate Index (FFR I) is then calculated as Filter Flow Rate Index=1000/t where t is time in seconds for 100 ml of filtrate to be collected. The results are shown in Table 13.

TABLE 13

Filter Flow Rate Index as function of Polyclar 10
concentration in Premix of Polyclar 10 and Britesorb D-300
(Xerogel from PQ Corporation)

| Wt. % Polyclar 10 in the admixture | 0 | 8 | 16 | 25 | 30 | 32 | 42 | 50 | 65 | 75 | 85 | 100 |
|---|---|---|---|---|---|---|---|---|---|---|---|---|
| Filter Flow Rate Index | 25 | 46 | 122 | 156 | 156 | 181 | 156 | 123 | 68 | 41 | 16 | 7 |

Filter Flow Rate maximizes at Polyclar 10 concentration of between 30% and 42%; (premix with Britesorb D-300)

Example 41

Filter Flow Rate Properties of Polyclar® 10/Xerogel

The experiment in Example 40 was repeated replacing Britesorb D-300 with BG6. The following weight % Polyclar 10 were used in this case, 0%, 17%, 25%, 30%, 32%, 41%, 50%, 65%, 75%, 85%, 90% and 100%. The results are tabulated in Table 14.

TABLE 14

Filter Flow Rate Index as function of Polyclar 10
concentration in Premix of Polyclar 10 and BG 6
(Xerogel from Millenium)

| Wt. % Polyclar 10 in the admixture | 0 | 17 | 25 | 30 | 32 | 41 | 50 | 65 | 75 | 85 | 90 | 100 |
|---|---|---|---|---|---|---|---|---|---|---|---|---|
| Filler Flow Rate Index | 6.5 | 15.5 | 19.5 | 13.5 | 19.5 | 92 | 162 | 111 | 88 | 68 | 46 | 7 |

In this case, Filter Flow Rate maximizes at Polyclar 10 concentration of between 41% and 65% (premix with BG6.)

Example 42

Effect of Complete Hydration on the Particle Size Distribution of Xerogel, Polyclar 10 and the Premix of Xerogel and Polyclar 10

The descriptions for various sample preparation are shown below and the results are summarized in Table 15.

Example 42-A1

Particle size distribution was determined on DRY powder of BG6 by Microtrac SRA 9200 (see results under DRY in Table 15). Later, 10 g of BG6 was added to a stoppered graduated cylinder. Distilled water was added to bring the volume to the 100 ml mark and mixed with the powder to disperse the solids. It was then allowed to stand overnight to fully hydrate the contents in the cylinder. The sample was then re-mixed by vigorous inversions of the cylinder to fully disperse the solid. The sample was then tested for particle size distribution, similar to the DRY sample, results are shown under Column IV in Table 15.

Example 42-A2

Particle size distribution was determined on DRY powder of Polyclar 10 by Microtrac 9200 (see results under DRY in Table 1). Later, 10 g of Polyclar 10 was added to a stoppered graduated cylinder. Distilled water was added to bring the volume to the 100 ml mark and mixed with the powder to disperse the solids. It was then allowed to stand overnight to fully hydrate the contents in the cylinder. The sample was then re-mixed by vigorous inversions of the cylinder to fully disperse the solid. The sample was then tested for particle size distribution, similar to the DRY sample, results are shown under Column IV in Table 15.

Example 42-A3

Polyclar 10/Xerogel (BG6) premix was prepared by mixing 70 g of BG6 and 30 g of Polyclar 10 in a V-blender for a period of 60 minutes. Particle size distribution of the premix was determined and recorded under Column III in Table 15. Later, log of this premix was added to a stoppered graduated cylinder. Distilled water was added to bring the volume to the 100 ml mark and mixed with the powder to disperse the solids. It was then allowed to stand overnight to fully hydrate the contents in the cylinder. The samples was then re-mixed by vigorous inversions of the cylinder to fully disperse the solids. The samples was then tested for particle size distribution, similar to the DRY sample, by Microtarc-SRA 9200, results are shown under HYDRATED in Table 15.

Example 42-B1

Example A1 was repeated, except in this case the Xerogel BG5 was used instead of Xerogel BG6.

Example 42-B2

Example 42-A3 was repeated, except in this case the 7:3 premix was made with Xerogel BG5 and Polyclar 10.

Example 42-C1

Example 42-A1 was repeated, except in this case the Xerogel Britesorb D-300 was used instead of Xerogel BG6.

Example 42-C2

Example 42-A3 was repeated, except in this case the 7:3 premix was made with Xerogel Britesorb D-300 and Polyclar 10.

Example 42-D1

Example 42-A1 was repeated, except in this case the Xerogel Lucilite XLC was used instead of Xerogel BG6.

Example 42-D2

Example 42-A3 was repeated, except in this case the 7:3 premix was made with Xerogel Lucilite XLC and Polyclar 10.

Example 42-E1

Example 42-A1 was repeated, except in this case the Xerogel Stabifix was used instead of Xerogel BG6.

Example 42-E2

Example 42-A3 was repeated, except in this case the 7:3 premix was made with Xerogel Stabifix and Polyclar 10.

Example 42-F1

Example 42-A1 was repeated, except in this case the Hydrogel Chillgarde was used instead of Xerogel BG6.

Example 42-F2

Example 42-A3 was repeated, except in this case the 7:3 premix was made with Hydrogel Chillgarde and Polyclar 10.

Example 42-G1

Example 42-A1 was repeated, except in this case the Hydrogel Britesorb A-100 was used instead of Xerogel BG6.

Example 42-G2

Example 42-A3 was repeated, except in this case the 7:3 premix was made with Hydrogel Britesorb A-100 and Polyclar 10.

The mean volume diameter of the hydrated premix of Xerogel and Polyclar 10 shows a marked increase compared to the individual components. This increase in the particle size under wet conditions is indicative of the flocculent effect of Polyclar 10.

Example 43

Effect of Different Modes of Filtration on the Residual PVP (Polyvinylpyrrolidone) in Beer Unstabilized beer samples were treated with different doses of Polyclar 10 and Xerogel (Britesorb D-300) and the premix of Britesorb D-300 and Polyclar 10, and then subjected to different modes of filtration as per procedure outlined in earlier examples and listed below. Residual PVP in beer was analyzed (by the method described in "Confirmation by Pyrolysis-Gas Chromatography of the Absence of Polyvinylpyrrolidone in Beer Treated with Cross-linked Polyvinylpyrrolidone" by T. M. H. Cheng and E. G. Malawer published in J. Am.Soc.Brew.Chem. 54(2):85–90, 1990). Results are shown in Table 16.

Procedure for Preparation of Beer Samples

Double Filtration—Filtration After Addition of each Component, 15:3 ratio Britesorb D-300: Polyclar 10

This was carried out as per procedure in Run No. 1 as shown in A in Table 16.

Double Filtration—Filtration After Addition of each Component, 15:7 ratio Britesorb D-300: Polyclar 10

This was carried out as per procedure in Run No. 2 as shown in B in Table 16.

Premix of Components—Single Filtration, 15:3 ratio Britesorb D-300: Polyclar 10

This was carried out as per procedure in Run No. 5 as shown in C in Table 16.

TABLE 15

| I | II | III-Dry | | IV-Hydrated 10% slurry in water, after 24 hours | | |
|---|---|---|---|---|---|---|
| | | Range of particle size, microns | Mv, microns (mean volume dia) | Range of particle size, microns | Mv, microns (mean volume dia) | V-Ratio of Mv (Hydrated) MV (Dry) |
| A1 | Xerogel (BG6) | 0.7–60.0 | 10.09 | 1.2–70.0 | 17.09 | 1.69 |
| A2 | Polyclar 10 | 1.3–100.0 | 33.34 | 1.5–200.0 | 45.76 | 1.37 |
| A3 | Premix, 7:3 ratio | 0.7–100.0 | 13.65 | 1.3–200.0 | 49.78 | 3.65 |
| B1 | Xerogel (BG5) | 0.75–161.4 | 28.42 | 2.121–161.4 | 25.80 | 0.91 |
| A2 | Polyclar 10 | 1.3–100.0 | 33.34 | 1.5–200.0 | 45.76 | 1.37 |
| B2 | Premix, 7:3 ratio | 0.810–161.4 | 28.97 | 4.241–248.9 | 64.55 | 2.20 |
| C1 | Xerogel (Britesorb D-300) | 0.75–88.0 | 18.47 | 2.121–62.23 | 16.43 | 0.89 |
| A2 | Polyclar 10 | 1.3–100.0 | 33.34 | 1.5–200.0 | 45.76 | 1.37 |
| C2 | Premix, 7:3 ratio | 1.06–88.0 | 21.21 | 3.27–176 | 50.37 | 2.40 |
| D1 | Xerogel (Lucilite XLC) | 0.75–62.23 | 15.03 | 2.121–44.0 | 13.40 | 0.89 |
| A2 | Polyclar 10 | 1.3–100.0 | 33.34 | 1.5–200.0 | 45.76 | 1.37 |
| D2 | Premix, 7:3 ratio | 0.75–74.0 | 16.93 | 4.241–248.9 | 80.02 | 4.70 |
| E1 | Xerogel (Stabifix) | 0.75–114.1 | 22.42 | 2.121–88.0 | 21.12 | 0.94 |
| A2 | Polyclar 10 | 1.3–100.0 | 33.34 | 1.5–200.0 | 45.76 | 1.37 |
| E2 | Premix, 7:3 ratio | 0.75–88.0 | 23.95 | 3.27–209.3 | 62.53 | 2.60 |
| F1 | Hydrogel (Chillgarde) | Clumping | Clumping | 3.0–80.70 | 19.35 | — |
| A2 | Polyclar 10 | 1.3–100.0 | 33.34 | 1.5–200.0 | 45.76 | 1.37 |
| F2 | Premix, 7:3 ratio | Clumping | Clumping | 6.0–248.9 | 76.08 | — |
| G1 | Hydrogel (Britesorb A-100) | Clumping | Clumping | 3.0–62.23 | 17.90 | — |
| A2 | Polyclar 10 | 1.3–100.0 | 33.34 | 1.5–200.0 | 45.76 | 1.37 |
| G2 | Premix, 7:3 ratio | Clumping | Clumping | 4.63–248.9 | 80.18 | — |

Premix of Components—Single Filtration, 15:7 ratio Britesorb D-300: Polyclar 10

This was carried out as per procedure in Run No. 6 as shown in D in Table 16.

While the invention has been described with particular reference to certain embodiments thereof, it will be understood that changes and modifications may be made which are within the skill of the art. Accordingly, it is intended to be bound only by the following claims.

TABLE 16

| Type of Treatment | Dose levels of Xerogel (Britesorb D-300): Polyclar used | Residual soluble PVP PVP ppm |
|---|---|---|
| A Double Filtration- Filtration after addition of each component, 15:3 ratio, Britesorb D-300: Polyclar 10 | 15 lb/100 bbl of Xerogel added first. Filtered. Then 3 lb/100 bbl Polyclar 10 added. Then filtered. | <0.5 |
| B Double Filtration- Filtration after addition of each component, 15:7 ratio, Britesorb D-300: Polyclar 10 | 15 lb/100 bbl of Xerogel added first. Filtered. Then 7 lb/100 bbl Polyclar 10 added. Then filtered. | 1.1 |
| C Premix of Components - Single filtration, 15:3 ratio, Britesorb D-300: Polyclar 10 | Xerogel and Polyclar 10 premixed at 15:3 ratio. Then dosed at 15 lb/100 bbl | below detection level |
| D Premix of Components - Single filtration, 15:7 ratio, Britesorb D-300: Polyclar 10 | Xerogel and Polyclar 10 premixed at 15:7 ratio. Then dosed at 22 lb/100 bbl | below detection level |

It can be seen from the results in Table 16 that the presence of silicagel when mixed with crosslinked PVP facilitates the adsorption of any trace residual soluble PVP.

Example 44

Microbiological Stability of Premix of Xerogel/Polyclar 10 System and Comparison with Other Premix and Single Components Polyclar 10/Xerogel (Britesorb D-300) premix was prepared by mixing 150 g of Xerogel (Britesorb D-300) and 30 g of Polyclar 10 in a V blender for a period of 60 minutes. Similarly, a premix of 150 g of Xerogel (Chillgarde) and 30 g of Polyclar 10 was prepared by mixing in a V blender for a period of 60 minutes. These two premixes together with single components of Polyclar 10, Chillgarde and britesorb D-300 were also used in the experiment. All the sample were assessed for microbiological stability using the test"Adequacy of Preservation (Challenge) Test" from Sutton Laboratories, Method MLM 100-9. The challenge test protocol is designed to assess effective antimicrobial activity over storage time, this simulating shelf life of the product.

TABLE 17

| | Mold count, cfu/g (colony forming units/g) | Comments |
|---|---|---|
| Polyclar 10 | <10 cfu/g | acceptable |
| Chillgarde (hydrogel) | 40,000 cfu/g | Not acceptable, very high |
| Britesorb D-300 (xerogel) | <10 cfu/g | acceptable |
| Premix, 15:3, Chillgarde (hydrogel):Polyclar 10 | <5,600 cfu/g | Not acceptable, high. |
| Premix, 15:3, xerogel (Britesorb D-300):Polyclar 10 | <10 cfu/g | acceptable |

The results in Table 17 above demonstrate that the premix of xerogel (Britesorb D-300) and Polyclar 10 gave a higher microbiological stability than the premix of Hydrogel (Chillgarde) and Polyclar 10. The premix of Xerogel (Britesorb D-300) and Polyclar 10 also has an acceptable microbiological stability. On the other hand, the premix of Hydrogel (Chillgarde) and Polyclar 10 had a "not acceptable" result with considerably higher mold growth.

What is claimed is:

1. A premix composition for clarifying beer effectively in a single-step process, without compactation, consisting essentially of, by weight,
   (a) about 70% of silica xerogel having less than 5% water therein, and a particle size in the dry state as defined by its mean volume average diameter, Mv, of about 5 to about 30µ, and
   (b) about 30% of crosslinked polyvinylpyrrolidone having a particle size in the dry state of about 10 to about 50µ, wherein the particle size of (a) is less than the particle size of (b) and the particle size of a water slurry of 10 wt. % of the premix composition is about 50µ.

2. A stable, flocculated aqueous slurry for homogeneously dosing and clarifying beer effectively in a single-step process, without compactation, consisting essentially of, by weight, (a) about 5% to about 20% of a premix composition of about 70% of silica xerogel having less than 5% water therein, and having a particle size in the dry state as defined by its mean volume average diameter, Mv, of 5 to 30µ, and (b) about 30% of crosslinked polyvinylpyrrolidone, having a particle size in the dry state of about 10 to about 50µ; wherein the particle size of (a) is less than the particle size of (b) and the particle size of a water slurry of 10 wt. % of the premix composition is about 50µ; and 80% to 95% water.

3. A process of stabilizing beer which comprises treating beer with the aqueous flocculated slurry of claim 2 and filtering the thus-treated beer.

* * * * *